United States Patent
Reddy et al.

(10) Patent No.: US 10,351,752 B2
(45) Date of Patent: Jul. 16, 2019

(54) COMPOSITIONS AND METHODS FOR SEALING OFF FLOW CHANNELS IN CONTACT WITH SET CEMENT

(71) Applicant: Saudi Arabian Oil Company, Dhahran (SA)

(72) Inventors: B. Raghava Reddy, Pearland, TX (US); Matthew Gary Hilfiger, Richmond, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/800,926

(22) Filed: Nov. 1, 2017

(65) Prior Publication Data

US 2018/0127635 A1 May 10, 2018

Related U.S. Application Data

(60) Provisional application No. 62/417,638, filed on Nov. 4, 2016.

(51) Int. Cl.
*E21B 33/13* (2006.01)
*C09K 8/42* (2006.01)
(Continued)

(52) U.S. Cl.
CPC .............. *C09K 8/44* (2013.01); *C08F 220/18* (2013.01); *C08F 222/02* (2013.01);
(Continued)

(58) Field of Classification Search
CPC ............ C09K 8/42; C09K 8/428; C09K 8/44; C09K 8/467; C09K 8/512; E21B 33/13; E21B 33/14; E21B 47/0005; E21B 47/102
See application file for complete search history.

(56) References Cited

U.S. PATENT DOCUMENTS

| | | | |
|---|---|---|---|
| 4,049,750 | A | 9/1977 | Brenner |
| 4,255,537 | A | 3/1981 | Fields |
| 4,420,588 | A | 12/1983 | Yoshioka |
| 4,579,670 | A | 4/1986 | Payne |
| 4,882,399 | A | 11/1989 | Tesoro et al. |
| 6,176,315 | B1 | 1/2001 | Reddy et al. |
| 6,192,986 | B1 | 2/2001 | Urlwin-Smith |
| 6,225,376 | B1 | 5/2001 | Klein et al. |
| 6,245,835 | B1 | 6/2001 | Klein et al. |
| 6,384,134 | B1 | 5/2002 | Hall et al. |
| 6,431,280 | B2 | 8/2002 | Bayliss et al. |

(Continued)

FOREIGN PATENT DOCUMENTS

| | | |
|---|---|---|
| DE | 102013219325 | 3/2015 |
| EP | 0050375 A1 | 4/1982 |

(Continued)

OTHER PUBLICATIONS

Senkal et al, "Glycidyl Methacrylate based Polymer Resins with Diethylene Triamine Tetra Acetic Acid Functions for Efficient Removal of Ca(II) and Mg(II)," Reactive & Functional Polymers, Published in 2001, pp. 151-157.

(Continued)

*Primary Examiner* — Zakiya W Bates
(74) *Attorney, Agent, or Firm* — Fish & Richardson P.C.

(57) ABSTRACT

Treating a subterranean formation with a composition including a maleic anhydride copolymer, an amine crosslinker, and a gelling agent. The maleic anhydride copolymer includes first repeat units I and II and at least one of second repeat units III and IV:

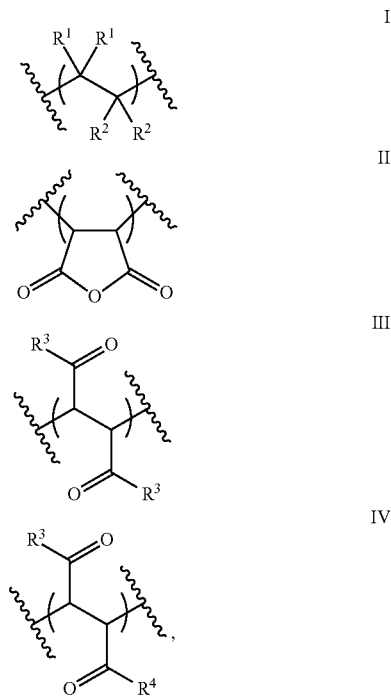

where each $R^1$ is independently —H, —O($C_1$-$C_5$) alkyl, or —($C_1$-$C_5$) alkyl; each $R^2$ is independently —H, —O($C_1$-$C_5$) alkyl, or —($C_1$-$C_5$) alkyl; each $R^3$ is independently —OH or —O$^-$M$^1$, each $M^1$ is independently an alkali metal, an alkaline earth metal, an ammonium ion, or a quaternary ammonium ion; and each $R^4$ is independently —NH$_2$ or —OM$^1$. The gelling agent includes at least one of: a calcium chelating agent, a calcium precipitating agent, a pH buffer, an agent reactive with hydroxide, and an acid generating agent, and promotes formation of a gel from the maleic anhydride copolymer and the amine crosslinker in contact with set cement.

21 Claims, No Drawings

(51) Int. Cl.

| | | |
|---|---|---|
| C09K 8/44 | (2006.01) | |
| C08F 222/02 | (2006.01) | |
| C08F 224/00 | (2006.01) | |
| C08K 3/26 | (2006.01) | |
| C08K 3/32 | (2006.01) | |
| C08K 3/38 | (2006.01) | |
| C08K 5/00 | (2006.01) | |
| E21B 33/14 | (2006.01) | |
| C09K 8/512 | (2006.01) | |
| C08F 220/18 | (2006.01) | |
| C08F 222/06 | (2006.01) | |
| C08K 5/17 | (2006.01) | |

(52) U.S. Cl.
CPC .......... *C08F 222/06* (2013.01); *C08F 224/00* (2013.01); *C08K 3/26* (2013.01); *C08K 3/32* (2013.01); *C08K 3/38* (2013.01); *C08K 5/0025* (2013.01); *C09K 8/428* (2013.01); *C09K 8/512* (2013.01); *E21B 33/14* (2013.01); *C08K 5/17* (2013.01); *C08K 2003/262* (2013.01); *C08K 2003/321* (2013.01); *C08K 2003/387* (2013.01); *C08L 2201/54* (2013.01)

(56) References Cited

U.S. PATENT DOCUMENTS

| | | |
|---|---|---|
| 6,433,097 B1 | 8/2002 | Nixon et al. |
| 6,509,039 B1 | 1/2003 | Nies |
| 6,710,139 B2 | 3/2004 | Hoyles et al. |
| 7,267,174 B2 | 9/2007 | Gonsveld et al. |
| 7,527,858 B2 | 5/2009 | Lundquist |
| 7,814,980 B2 | 10/2010 | Bryant et al. |
| 9,150,781 B2 | 10/2015 | Reddy et al. |
| 9,283,299 B2 | 3/2016 | Mikos et al. |
| 9,321,956 B2 | 4/2016 | Nguyen et al. |
| 2003/0181543 A1 | 9/2003 | Reddy |
| 2005/0079222 A1 | 4/2005 | Arbos |
| 2010/0016179 A1 | 1/2010 | Duncum et al. |
| 2010/0036017 A1 | 2/2010 | Eoff et al. |
| 2010/0048429 A1 | 2/2010 | Dobson et al. |
| 2013/0000905 A1 | 1/2013 | Reddy et al. |
| 2013/0220612 A1 | 8/2013 | Karcher et al. |
| 2013/0233546 A1 | 9/2013 | Liang et al. |
| 2013/0269819 A1 | 10/2013 | Ruby |
| 2013/0306314 A1 | 11/2013 | Curtice |
| 2014/0128296 A1 | 5/2014 | Soane |
| 2014/0262296 A1 | 9/2014 | Dobson et al. |
| 2015/0114649 A1 | 4/2015 | Jimenez et al. |
| 2016/0122625 A1 | 5/2016 | Singh et al. |

FOREIGN PATENT DOCUMENTS

| | | |
|---|---|---|
| EP | 0059062 | 9/1982 |
| EP | 898050 | 2/1999 |
| EP | 2444455 | 4/2012 |
| GB | 2444158 | 5/2008 |
| WO | 2010141534 | 12/2010 |
| WO | 2011012857 A2 | 2/2011 |
| WO | 2011012857 A3 | 2/2011 |
| WO | 2015065378 | 5/2015 |
| WO | 2015088515 | 6/2015 |

OTHER PUBLICATIONS

Gunbas, "Progress in Organic Coatings," vol. 76, No. 12, Dec. 2013; pp. 1720-1725.
International Search Report and Written Opinion issued in International Application No. PCT/US2016/051533 dated Nov. 22, 2016; 14 pages.
International Search Report and Written Opinion issued in International Application No. PCT/US2016/051507 dated Nov. 18, 2016; 11 pages.
International Search Report and Written Opinion in International Application No. PCT/US2017/059539, dated Dec. 20, 2017, 12 pages.
International Search Report and Written Opinion in International Application No. PCT/US2017/059534 dated Feb. 1, 2018, 15 pages.
Gulf Cooperation Council Examination Report issued in GCC Application No. GC2017-34213 dated Mar. 26, 2019, 3 pages.

COMPOSITIONS AND METHODS FOR SEALING OFF FLOW CHANNELS IN CONTACT WITH SET CEMENT

CROSS-REFERENCE TO RELATED APPLICATION

This application claims the benefit of U.S. Patent Application Ser. No. 62/417,638 entitled "COMPOSITIONS AND METHODS FOR SEALING OFF FLOW CHANNELS IN CONTACT WITH SET CEMENT" and filed Nov. 4, 2016, which is incorporated by reference herein in its entirety.

TECHNICAL FIELD

This document relates to remedial aqueous resin compositions for sealing off flow channels in contact with set cement and methods of using these compositions.

BACKGROUND

Polymeric resin compositions including a maleic anhydride copolymer crosslinked with an amine crosslinker have been used to block fluid flow in siliceous and other natural rock formations. However, the presence of set cement, including Portland cement, typically inhibits the ability of these compositions to form crosslinked gels. In particular, when there is an unwanted gas or liquid flow through flow channels within a cement sheath behind a casing, or via a microannulular flow channel between cement sheath and a metal casing, resin based gel compositions in contact with the set cement may not demonstrate the desired sealing.

SUMMARY

In a first general aspect, a composition for treating a subterranean formation includes a maleic anhydride copolymer, an amine crosslinker, and a gelling agent. The maleic anhydride copolymer includes first repeat units I and II and at least one of second repeat units III and IV, as shown below:

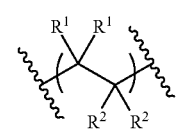

I

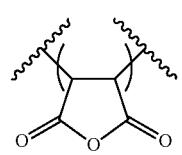

II

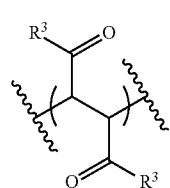

III

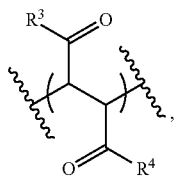

IV where each $R^1$ is independently selected from the group consisting of —H, —O($C_1$-$C_5$) alkyl, and —($C_1$-$C_5$) alkyl; each $R^2$ is independently selected from the group consisting of —H, —O($C_1$-$C_5$) alkyl, and —($C_1$-$C_5$) alkyl; each $R^3$ is independently selected from the group consisting of —OH and —O⁻$M^1$, each $M^1$ is independently selected from the group consisting of an alkali metal, an alkaline earth metal, an ammonium ion, and a quaternary ammonium ion; and each $R^4$ is independently selected from the group consisting of —$NH_2$ and —$OM^1$. The gelling agent includes at least one of a calcium chelating agent, a calcium precipitating agent, a pH buffer, an agent reactive with hydroxide, and an acid generating agent. The gelling agent promotes formation of a gel from the maleic anhydride copolymer and the amine crosslinker in contact with set cement.

In a second general aspect, treating a subterranean formation includes providing to the subterranean formation a composition of the first general aspect, and crosslinking the maleic anhydride copolymer of the composition with the amine crosslinker of the composition to form a sealant, where the gelling agent promotes formation of a sealant in contact with set cement.

In a third general aspect, treating a subterranean formation includes providing to the subterranean formation comprising a cemented zone comprising set cement an aqueous solution including the gelling agent of the first general aspect to yield a pretreated subterranean formation, providing to the pretreated subterranean formation a composition including the maleic anhydride copolymer and the amine crosslinker of the first general aspect, and crosslinking the maleic anhydride copolymer of the composition with the amine crosslinker of the composition to form a sealant, where the gelling agent promotes formation of a sealant in contact with set cement.

Implementations of the first through third general aspects may include one or more of the following features.

Second repeat units III and IV may include repeat unit IIIA and repeat unit IVA, respectively:

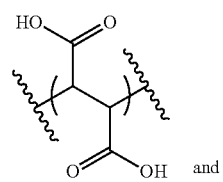

IIIA and

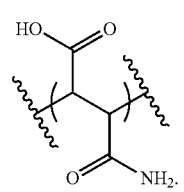

IVA

In some cases, the gelling agent includes a salt of a weak acid and a base. The base may be an organic base or an inorganic base, a strong base or a weak base. The gelling agent may include sodium hexametaphosphate, sodium tetraborate, disodium hydrogen phosphate, sodium carbonate, or sodium phosphate. In some cases, the gelling agent includes a salt of a weak acid and an organic base. In certain cases, the gelling agent includes the pentasodium salt of amino tris(methylene phosphonic acid) or a buffer solution of a weak acid and an organic base. In one example, the gelling agent includes a buffer solution of ethanolamine and citric acid. The gelling agent may be about 0.5% to about 10%, or about 0.5% to about 2.5% of the composition by weight. The pH of the composition is typically in a range of about 3 to about 10.

The gelling agent promotes formation of the gel from the maleic anhydride copolymer and the amine crosslinker in contact with set cement at a temperature in a range of about 100° F. to about 180° F. In some cases, the gelling agent promotes formation of the gel from the maleic anhydride copolymer and the amine crosslinker in contact with set cement in about 8 hours or less, in about 6 hours or less, or in about 4 hours or less.

Implementations of the second and third general aspects may include one or more of the following features.

In some cases, crosslinking the composition to form the sealant occurs near a casing, a casing-casing annulus, a tubing-casing annulus, or a casing-formation annulus. Crosslinking the composition to form the sealant typically prevents or retards undesired loss or flow of wellbore fluid into the formation or of formation fluids into the wellbore.

Implementations of the third general aspect may include one or more of the following features.

In some cases, the composition may be free of a gelling agent, such as a calcium chelating agent, a calcium precipitating agent, a pH buffer, an agent reactive with hydroxide, and an acid generating agent. In certain cases, the gelling agent is a first gelling agent, and the composition includes a second gelling agent comprising at least one of a calcium chelating agent, a calcium precipitating agent, a pH buffer, an agent reactive with hydroxide, and an acid generating agent. The first gelling agent and the second gelling agent may be the same or different.

The details of one or more implementations of the subject matter described in this specification are set forth in the description below. Other features, aspects, and advantages of the subject matter will become apparent from the description and the claims.

DETAILED DESCRIPTION

A composition for sealing off flow channels in contact with set cement includes a maleic anhydride copolymer, an amine crosslinker, and a gelling agent. As used herein, "maleic anhydride copolymer" generally refers to a maleic anhydride/alkene copolymer or a salt thereof. The set cement may be Portland cement, which hardens by reacting with water and forms a water-resistant product. Aqueous fluids in contact with set cement have a high pH due at least in part to the leaching of alkaline materials such as calcium hydroxide and calcium silicates. The gelling agent reduces interference of the set cement with crosslinking reactions in the composition, and thus promotes formation of a gel in contact with set cement. Formation of the gel allows the use of these compositions to repair flow channels in contact with set cement, such as treatment of wells with casing-casing-annulus problems, including squeezing into set cement to seal off flow channels.

The maleic anhydride copolymer includes first repeat units I and II:

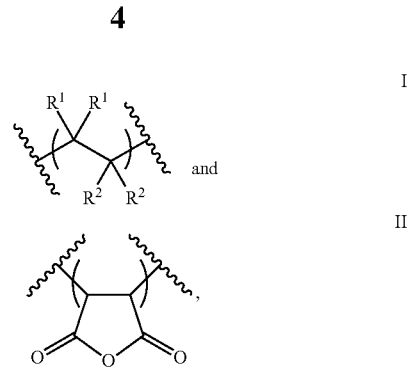

where each $R^1$ is independently selected from the group consisting of —H, —O($C_1$-$C_5$) alkyl, and —($C_1$-$C_5$) alkyl. Each $R^2$ is independently selected from the group consisting of —H, —O($C_1$-$C_5$) alkyl, and —($C_1$-$C_5$) alkyl. The maleic anhydride copolymer further includes at least one second repeat unit selected from the group consisting of repeat units III and IV:

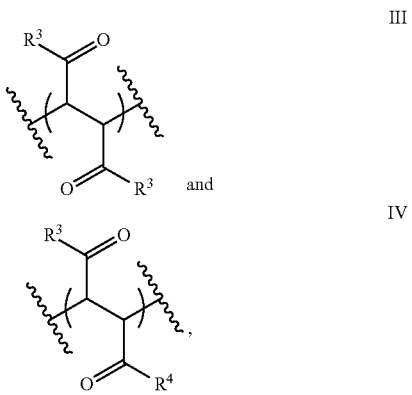

where each $R^3$ is independently selected from the group consisting of —OH and —O$^-$$M^1$, each $M^1$ is independently selected from the group consisting of an alkali metal, an alkaline earth metal, an ammonium ion, and a quaternary ammonium ion, and each $R^4$ is independently selected from the group consisting of —$NH_2$ and —O$M^1$. In some embodiments, $M^1$ is selected from the group consisting of $Na^+$, $K^+$, $Mg^{2+}$, $NH_4^+$, $Ca^{2+}$, and $Ba^{2+}$. For example, $M^1$ can be selected from the group consisting of $Na^+$ and $K^+$. When at least one $R^3$ in repeat unit III or IV is —OH, the repeat unit is referred to as a "hydrolyzed" repeat unit, formed, for example, by reaction of its nonhydrolyzed counterpart with water. When at least one $R^3$ in repeat unit III or IV is —O$^-$$M^1$ where $M^1$ is $NH_4^+$, the repeat unit is referred to as an "ammonolyzed" repeat unit, formed, for example, by reaction of its nonammonolyzed counterpart with ammonium hydroxide.

In some embodiments, each $R^3$ is —OH and $R^4$ is —$NH_2$, such that repeat units III and IV are represented as repeat units IIIA and IVA, respectively, shown below:

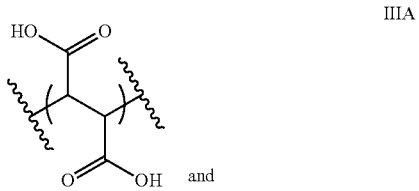

-continued

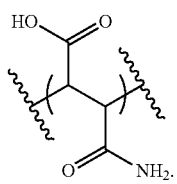
IVA

In some embodiments, the at least one second repeat unit includes repeat unit III. In some embodiments, the ratio of repeat unit III to repeat unit II is about 1:10 to about 10:1. For example, the ratio of repeat unit III to repeat unit II can be about 8:1 to about 1:8, about 6:1 to about 1:6, about 4:1 to about 1:4, about 2:1 to about 1:2, or about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10. In some embodiments, the ratio of repeat unit III to repeat unit II is about 1:2. In some embodiments, the ratio of repeat unit III to repeat unit II is about 2:1.

In some embodiments, the at least one second repeat unit includes repeat unit IV. In some embodiments, the ratio of repeat unit IV to repeat unit II is about 1:10 to about 10:1. For example, the ratio of repeat unit IV to repeat unit II can be about 8:1 to about 1:8, about 6:1 to about 1:6, about 4:1 to about 1:4, about 2:1 to about 1:2, or about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10. In some embodiments, the ratio of repeat unit IV to repeat unit II is about 1:2.

In some embodiments, the at least one second repeat unit includes repeat units III and IV. The ratio of repeat unit III to repeat unit IV can be about 1:10 to about 10:1, and the ratio of the repeat unit IV to repeat unit II can be about 1:10 to about 10:1. For example, the ratio of repeat unit III to repeat unit IV can be about 8:1 to about 1:8, about 6:1 to about 1:6, about 4:1 to about 1:4, about 2:1 to about 1:2, or about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10, and the ratio of repeat unit IV to repeat unit II can be about 8:1 to about 1:8, about 6:1 to about 1:6, about 4:1 to about 1:4, about 2:1 to about 1:2, or about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10.

In some embodiments, each $R^1$ is independently selected from the group consisting of —H, —OCH$_3$, and —CH$_3$ and each $R^2$ is independently selected from the group consisting of —H, —OCH$_3$, and —CH$_3$. For example, $R^1$ can be H, and each $R^2$ can be independently selected from the group consisting of —H, —OCH$_3$, and —CH$_3$.

In some embodiments, repeat unit I is selected from the group consisting of:

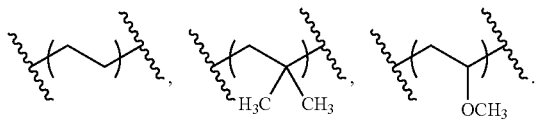

For example, repeat unit I can have the structure:

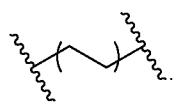

In some embodiments, repeat unit I has the structure:

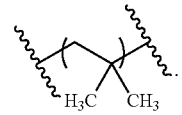

In some embodiments, the maleic anhydride copolymer has a weight-average molecular weight of about 10,000 Da to about 500,000 Da. For example, the maleic anhydride copolymer can have a weight-average molecular weight of about 10,000-100,000 Da, about 20,000-90,000 Da, about 30,000-70,000 Da, about 40,000-60,000 Da, or a weight-average molecular weight of about 45,000-55,000 Da or a weight-average molecular weight of about 10,000 Da, 20,000 Da, 30,000 Da, 40,000 Da, 50,000 Da, 60,000 Da, 70,000 Da, 80,000 Da, 90,000 Da or about 100,000 Da. The maleic anhydride copolymer can have a weight-average molecular weight of about 100,000-500,000 Da, about 200,000-400,000 Da, about 250,000-350,000 Da or a weight-average molecular weight of about 100,000 Da, 150,000 Da, 200,000 Da, 250,000 Da, 300,000 Da, 350,000 Da, 400,000 Da, 450,000 Da or about 500,000 Da.

In some embodiments, the maleic anhydride copolymer has a number-average molecular weight of about 10,000 Da to about 500,000 Da. For example, the maleic anhydride copolymer can have a number-average molecular weight of about 10,000-100,000 Da, about 20,000-90,000 Da, about 30,000-70,000 Da, about 40,000-60,000 Da, or a number-average molecular weight of about 45,000-55,000 Da or a number-average molecular weight of about 10,000 Da, 20,000 Da, 30,000 Da, 40,000 Da, 50,000 Da, 60,000 Da, 70,000 Da, 80,000 Da, 90,000 Da or about 100,000 Da. The maleic anhydride copolymer can have a number-average molecular weight of about 100,000-500,000 Da, about 200,000-400,000 Da, about 250,000-350,000 Da or a number-average molecular weight of about 100,000 Da, 150,000 Da, 200,000 Da, 250,000 Da, 300,000 Da, 350,000 Da, 400,000 Da, 450,000 Da or about 500,000 Da.

In some embodiments, the distribution of first repeat units I and II can be alternating, random, or in blocks, and the resulting copolymers are referred to as alternating, random, or block copolymers, respectively. In an embodiment, the copolymer is an alternating copolymer, with alternating repeat units I and II.

Examples of suitable maleic anhydride copolymers include ISOBAM® polymers from Kuraray Co., Ltd. (Tokyo, Japan), ethylene-maleic anhydride copolymers and propylene-maleic anhydride copolymers from Honeywell Corporation (USA), and ZEMAC® copolymers from Vertellus (Spain).

In some embodiments, the amine crosslinker includes at least one of a polyalkyleneimine, polyetheramine, polyalkylenepolyamine, aliphatic amine, polyfunctional aliphatic amine, arylalkylamine, heteroarylalkylamine, chitosan. For example, the amine crosslinker can include at least one of polyethyleneimine, ethylenediamine, diethylenetriamine (DETA), triethylenetetraamine (TETA), tetraethylenepentaamine (TEPA), 1,2-propylenediamine, 1,3-propylenediamine, dipropylenetriamine, tripropylenetetramine, tetrapropylenepentamine, ethylene propylene triamine, ethylene dipropylene tetramine, diethylene propylene pentamine, ethylene tripropylene pentamine, diethylene dipropylene pentamine, triethylene propylene pentamine, polyethylenimine (e.g., EPOMIN® from Nippon Shokubai, LUPASOL™ from BASF, LUPAMINE™ from BASF, etc.), poly(ethyleneoxy)amine (e.g., JEFFAMINE® EDR-148 from Huntsman Corporation), and poly(propyleneoxy)amine (e.g., JEFFAMINE® T-403 from Huntsman Corporation, Polyetheramine T-5000 from BASF). Additionally, the amine crosslinker can be selected from the group consisting of polyethyleneimine, poly(ethyleneoxy)amine, and TEPA. In some embodiments, the amine crosslinker is a polyetheramine. In some embodiments, the amine crosslinker is an aliphatic amine. In some embodiments, the amine crosslinker is TEPA.

In some embodiments, the polyethyleneimine has a weight-average molecular weight of about 500 Da to about 1,000,000 Da. In some embodiments, the polyethyleneimine has a weight-average molecular weight of about 1,000-1,000,000. For example, the polyethyleneimine can have a weight-average molecular weight of about 1,000-5,000, 5,000-10,000, 10,000-50,000, 50,000-150,000, 150,000-500,000 or about 500,000 to about 1,000,000 or about 1,000, 2,000, 3,000, 4,000, 5,000, 10,000, 25,000, 50,000, 100,000, 250,000, 500,000, 750,000 or about 1,000,000. In some embodiments, the polyethyleneimine has a weight-average molecular weight of about 1,800 Da. The polyethyleneimine can have a weight-average molecular weight of about 1,800 Da. The polyethyleneimine can have a weight-average molecular weight of about 750,000 Da.

In some embodiments, the ratio of the maleic anhydride copolymer to the amine crosslinker is about 50:1 to about 1:1. For example, the weight ratio of the crosslinkable polymer to the amine crosslinker can be about 40:1 to about 1:1, about 30:1 to about 1:1, about 20:1 to about 1:1, about 15:1 to about 1:1, about 10:1 to about 1:1, about 9:1 to about 1:1, about 7:1 to about 1:1, about 5:1 to about 1:1, about 4:1 to about 1:1, about 3:1 to about 1:1, or about 2:1 to about 1:1, or about, 50:1, 40:1, 30:1, 20:1, 15:1, 10:1, 9:1, 8:1, 7:1, 6:1, 5:1, 4:1, 3:1, 2:1, 1:1. The ratio of the maleic anhydride copolymer to the amine crosslinker can be varied based on the desired properties of the crosslinked product to be formed, such as the desired gel time.

The gelling agent may include a calcium chelating agent, a calcium precipitating agent, a pH buffer, an agent reactive with hydroxide, or an acid generating agent. "Acid generating agent" generally refers to monomeric and polymeric compounds which, upon reaction with water, generate an organic or inorganic acid. Suitable examples of acid generating agents include organic esters such as ethyl acetate, triethyl citrate, and diethyl tartrate; acid chlorides such as benzoyl chloride; and acid anhydrides such as succinic anhydride, lactide, and acetic anhydride. An acid generating agent may be polymeric. Suitable polymeric acid generating agents include polylactic acid and polyglycolic acid.

An additive may be classified under more than one category. For example, sodium hydrogen phosphate may be considered a salt of a weak acid, namely phosphoric acid, and a strong base, namely sodium hydroxide. It is also a buffer, because it has both acid and base components that can function as a buffering agent. The same compound can also function as a calcium precipitating agent, since calcium phosphate that is formed in the reaction between calcium hydroxide or calcium silicate, both of which are components of set cement and sodium hydrogen phosphate, is insoluble in water. Similarly, citric acid and an organic base such as ethanolamine or an inorganic base such as sodium hydroxide or sodium phosphate forms a buffer system that contains partially neutralized citric acid. The resulting citrate salt is a calcium chelating agent, as well as a calcium precipitating agent while functioning as a component of the buffer system. The partially neutralized citric acid can also act as an agent reactive with hydroxide present as calcium hydroxide in set cement.

In some embodiments, the gelling agent is a salt formed by a reaction between a weak acid and a base. The base may be strong or weak, organic or inorganic. In other embodiments, the gelling agent is a buffer solution formed from a weak organic acid and a weak organic base. Examples of such gelling agents include sodium hexametaphosphate, sodium tetraborate (synthetic or mineral borax), disodium hydrogen phosphate, sodium carbonate, sodium phosphate, the pentasodium salt of amino tris(methylene phosphonic acid), and a solution of ethanolamine and citric acid. The gelling agent can be about 0.5% to about 10% of the composition by weight. In some cases, the gelling agent is about 0.5% to about 2.5% of the composition by weight. The composition can have a basic pH or an acidic pH. In some examples, the composition has a pH of about 3 to 10, about 7 to about 10, or about 8 to about 9. In other examples, the composition has a pH of about 3 to about 6, about 3 to about 7, or about 4 to about 6.

In some embodiments, the composition further includes an aqueous carrier. The aqueous carrier can include water, brine, produced water, flowback water, brackish water, sea water, or combinations thereof. In some embodiments, the aqueous carrier is about 50% to about 98% by weight of the composition. In some embodiments, the aqueous carrier is about 5% to about 98% by weight of the composition. For example, the aqueous carrier can be about 60%-98%, 70%-98%, 80%-98%, 90%-98%, 95%-98%or about 85%-98% by weight of the composition or about 50%, 60%, 70%, 80%, 85%, 90%, 91%, 92%, 93%, 94%, 95%, 96%, 97%, or about 98% by weight of the composition.

The composition typically gels faster in the absence of set cement than in contact with set cement. In some embodiments, the composition has a gel time of less than about 24 hours, less than about 12 hours, less than about 10 hours, less than about 8 hours, or less than about 6 hours at about 100° F. to 180° F. For example, the composition can have a gel time of less than about 24 hours at about 100° F. to 180° F. when the maleic anhydride copolymer and amine crosslinker combined are about 1% to about 5% by weight of the composition, about 5% to about 10%, about 10% to about 20%, or about 20% to about 30% by weight of the composition, and the gelling agent is about 0.5% to about 10% by weight of the composition. In one example, the composition can have a gel time of less than about 12 hours at about 100° F. to 180° F. when the maleic anhydride copolymer is about 10% by weight of the composition, the amine crosslinker is about 1% by weight of composition, the gelling agent is about 1% to about 2% by weight of the composition, and the carrier solvent is water. In another example, the composition can have a gel time of less than about 24 hours at about 100° F. to 180° F. when the maleic anhydride copolymer and amine crosslinker are about 5% by weight of composition, the gelling agent is about 1% by weight of the composition, and the carrier solvent is water. In some embodiments, the composition has a gel time of less than about 8 hours or about 6 hours at about 100° F. to 180° F. when the maleic anhydride copolymer, the amine crosslinker, and the gelling agent are present in a weight ratio of 10:1:1 to 10:1:2 and the carrier solvent is water.

Also provided in this disclosure is a composition including a maleic anhydride copolymer, an amine crosslinker, a gelling agent, and an aqueous carrier. The maleic anhydride copolymer includes the repeat units:

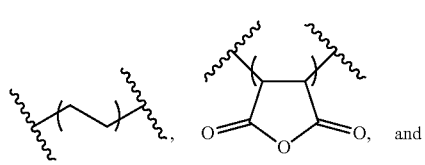, and

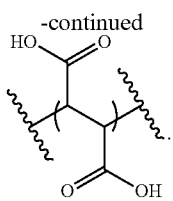

The aqueous carrier includes water, brine, produced water, flowback water, brackish water, sea water, or combinations thereof.

In some embodiments, the amine crosslinker is selected from the group consisting of polyethyleneimine, TEPA, and combinations thereof. The polyethyleneimine can have a weight-average molecular weight of about 1,800 Da. The polyethyleneimine can have a weight-average molecular weight of about 750,000 Da. In some embodiments the amine crosslinker is TEPA.

In some embodiments, the aqueous carrier can include water, brine, produced water, flowback water, brackish water, sea water, or combinations thereof.

Additionally, provided in this disclosure is a composition including a maleic anhydride copolymer, an amine crosslinker, a gelling agent, and an aqueous carrier. The maleic anhydride copolymer includes the repeat units:

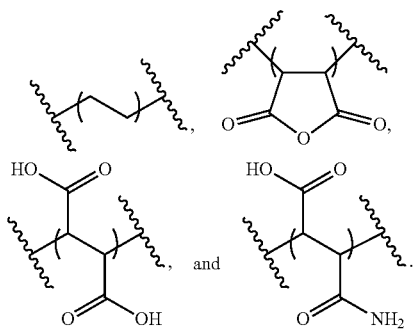

The aqueous carrier includes water, brine, produced water, flowback water, brackish water, sea water, or combinations thereof.

Additionally, provided in this disclosure is a composition including a maleic anhydride copolymer, an amine crosslinker, a gelling agent, and an aqueous carrier. The maleic anhydride copolymer includes the repeat units:

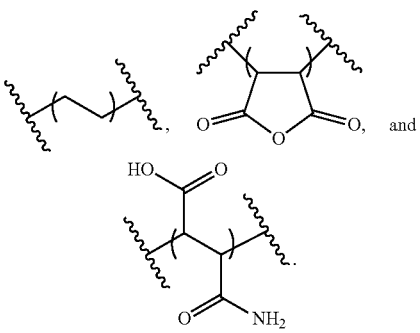

The aqueous carrier includes water, brine, produced water, flowback water, brackish water, sea water, or combinations thereof.

In some embodiments, the amine crosslinker is selected from the group consisting of polyethyleneimine, TEPA, and combinations thereof. The polyethyleneimine can have a weight-average molecular weight of about 1,800 Da. The polyethyleneimine can have a weight-average molecular weight of about 750,000 Da. In some embodiments the amine crosslinker is TEPA.

In some embodiments, the aqueous carrier can include water, brine, produced water, flowback water, brackish water, sea water, or combinations thereof.

Also provided in this disclosure is a composition including a maleic anhydride copolymer, an amine crosslinker, a gelling agent, and an aqueous carrier. The maleic anhydride copolymer includes the repeat units:

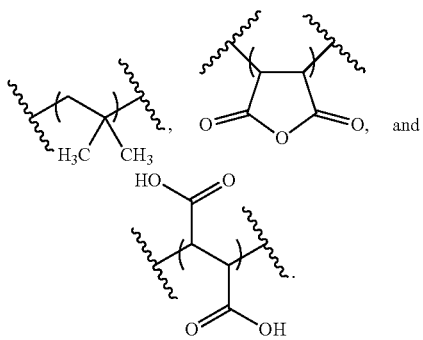

The aqueous carrier includes water, brine, produced water, flowback water, brackish water, sea water, or combinations thereof.

In some embodiments, the amine crosslinker is selected from the group consisting of polyethyleneimine and TEPA. The polyethyleneimine can have a weight-average molecular weight of about 1,800 Da. The polyethyleneimine can have a weight-average molecular weight of about 750,000 Da.

In some embodiments the amine crosslinker is TEPA. The ratio of the maleic anhydride copolymer to TEPA can be about 10:0.1 to about 10:3, about 10:0.2 to about 10:1, or about 10:0.3 to about 10:0.7. The ratio of the maleic anhydride copolymer to TEPA can be about 10:0.1, about 10:0.3, about 10:0.4, about 10:0.5, about 10:0.6, about 10:0.7, about 10:1, about 10:1, or about 10:2. In some embodiments, ratio of the maleic anhydride copolymer to TEPA can be about 10:0.5.

In some embodiments, the aqueous carrier can include water, brine, produced water, flowback water, brackish water, sea water, or combinations thereof.

The composition can have a basic pH or an acidic pH. For example, the composition can have a pH of about 3 to 10, about 7 to about 10, or about 8 to about 9. In some embodiments, the composition has a pH of about 3 to about 6, about 3 to about 7, or about 4 to about 6.

Additionally, provided in this disclosure is a composition including a maleic anhydride copolymer, an amine crosslinker, a gelling agent, and an aqueous carrier. The maleic anhydride copolymer includes the repeat units:

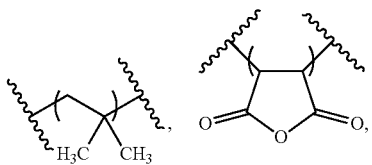

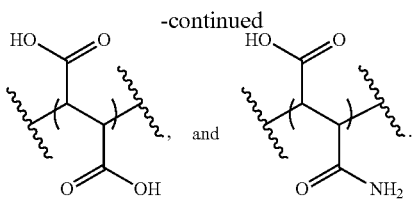

The aqueous carrier includes water, brine, produced water, flowback water, brackish water, sea water, or combinations thereof.

Additionally, provided in this disclosure is a composition including a maleic anhydride copolymer, an amine crosslinker, a gelling agent, and an aqueous carrier. The maleic anhydride copolymer includes the repeat units:

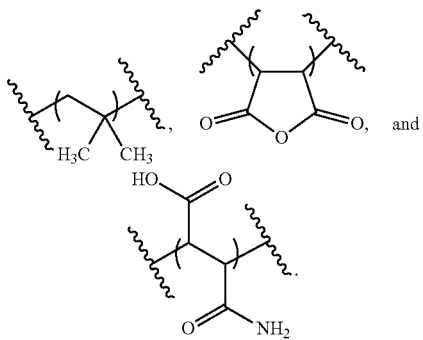

The aqueous carrier includes water, brine, produced water, flowback water, brackish water, sea water, or combinations thereof.

In some embodiments, the amine crosslinker is polyethyleneimine, TEPA, or a combination thereof. The polyethyleneimine can have a weight-average molecular weight of about 1,800 Da. The polyethyleneimine can have a weight-average molecular weight of about 750,000 Da.

In some embodiments, the amine crosslinker is TEPA. The ratio of the maleic anhydride copolymer to TEPA can be about 10:0.1 to about 10:3, about 10:0.2 to about 10:1, or about 10:0.3 to about 10:0.7. The ratio of the maleic anhydride copolymer to TEPA can be about 10:0.1, about 10:0.3, about 10:0.4, about 10:0.5, about 10:0.6, about 10:0.7, about 10:1, about 10:1, or about 10:2. In some embodiments, ratio of the maleic anhydride copolymer to TEPA can be about 10:0.5.

In some embodiments, the aqueous carrier can include water, brine, produced water, flowback water, brackish water, sea water, or combinations thereof.

The composition can have a basic pH or an acidic pH. For example, the composition can have a pH of about 3 to 10, about 7 to about 10, or about 8 to about 9. In some embodiments, the composition has a pH of about 3 to about 6, about 3 to about 7, or about 4 to about 6.

Methods of Producing Maleic Anhydride Copolymers

In one example, maleic anhydride copolymers containing the repeat unit III can be produced by exposing a maleic anhydride copolymer including repeat units I and II to a sodium hydroxide solution. Each $R^1$ is independently selected from the group consisting of —H, —O($C_1$-$C_5$) alkyl, and —($C_1$-$C_5$) alkyl. Each $R^2$ is independently selected from the group consisting of —H, —O($C_1$-$C_5$) alkyl, and —($C_1$-$C_5$) alkyl. Exposure to the sodium hydroxide solution can hydrolyze a portion of the maleic anhydride functional groups to provide the 1,2-dicarboxylic acid repeat unit III as its sodium salt (e.g., IIIA). Other suitable basic solutions can also be used hydrolyze at least a portion of the maleic anhydride repeat units of the maleic anhydride copolymer. The ratio of repeat units III to II can be increased, in one example, by increasing the equivalents of sodium hydroxide used in the hydrolysis reaction and/or increasing the reaction time. Alternatively, acid catalyzed hydrolysis may be used to produce the 1,2-dicarboxylic acid repeat unit III from at least a portion of the maleic anhydride repeat units present in the maleic anhydride copolymer.

In one example, maleic anhydride copolymers containing repeat unit IV can be produced by exposing a maleic anhydride copolymer including the repeat units I and II to an ammonium hydroxide solution. Each $R^1$ is independently selected from the group consisting of —H, —O($C_1$-$C_5$) alkyl, and —($C_1$-$C_5$) alkyl. Each $R^2$ is independently selected from the group consisting of —H, —O($C_1$-$C_5$) alkyl, and —($C_1$-$C_5$) alkyl. Exposure to the ammonium hydroxide solution hydrolyzes and ammonolyzes a portion of the maleic anhydride functional groups to provide repeat units III and IV, a carboxylic acid/amide repeat unit. Other suitable solutions can also be used to form second repeat unit IV. The ratio of repeat units IV to II can be increased by increasing the equivalents of ammonium hydroxide used in the hydrolysis reaction (e.g., hydrolysis/ammonolysis) and/or increasing the reaction time.

Other Components

In various embodiments, the composition including the maleic anhydride copolymer, amine crosslinker, and gelling agent can further include one or more suitable additional components.

The composition including the maleic anhydride copolymer, amine crosslinker, and gelling agent can further include one or more fluids. The composition can include a fluid including at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, dimethyl formamide, diesel, kerosene, mineral oil, a hydrocarbon including an internal olefin, a hydrocarbon including an alpha olefin, xylenes, an ionic liquid, methyl ethyl ketone, and cyclohexanone. The composition can include any suitable proportion of the one or more fluids, such as about 0.001% to about 40%, about 20% to about 40%, or about 0.001% or less by weight, or about 0.01%, 0.1%, 1%, 2%, 3%, 4%, 5%, 10%, 15%, 20%, 30%, 40% or more by weight of the composition.

The composition can further include a viscosifier, in addition to the maleic anhydride copolymer, amine crosslinker, and gelling agent. The viscosifier can be present in any suitable concentration, such as more, less, or an equal concentration as compared to the concentration of the maleic anhydride copolymer, amine crosslinker, and gelling agent. The viscosifier can include at least one of a substituted or unsubstituted polysaccharide. The viscosifier can include a polymer including at least one monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide.

The composition including the maleic anhydride copolymer, amine crosslinker, and gelling agent can be combined with any suitable downhole fluid before, during, or after the placement of the composition in a subterranean formation or the contacting of the composition and a subterranean material. For example, the composition including the maleic anhydride copolymer, amine crosslinker, and gelling agent can be combined with a downhole fluid above the surface, and then the combined composition is placed in a subterranean formation or contacted with a subterranean material. Alternatively, the composition including the maleic anhydride copolymer, amine crosslinker, and gelling agent can be injected into a subterranean formation to combine with a downhole fluid, and the combined composition is contacted with a subterranean material or is considered to be placed in the subterranean formation. In some embodiments, at least one of prior to, during, and after the placement of the composition in the subterranean formation or contacting of the subterranean material and the composition, the composition is used in the subterranean formation alone or in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reduce friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the mixture with the composition including the crosslinkable polymer, amine crosslinker, and gelling agent in any suitable amount, such as about 1% or less by weight of the composition, about 2%, 3%, 4%, 5%, 10%, 15%, 20%, 30%, 40%, 50%, 60%, 70%, 80%, 85%, 90%, 95%, 96%, 97%, 98%, or about 99% or more by weight of the mixture.

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

The crosslinked reaction product can form a sealant (e.g., a sealant gel). In some embodiments, the sealant is a stiff gel, a ringing gel, or a lipping gel.

Treating a Subterranean Formation

Treating a subterranean formation includes providing to a subterranean formation a composition and crosslinking the composition to form a sealant. The composition includes a maleic anhydride copolymer, an amine crosslinker, and a gelling agent. The maleic anhydride copolymer includes repeat units I and II. The maleic anhydride copolymer further includes at least one second repeat unit selected from the group consisting of second repeat units III and IV.

In some embodiments, the providing occurs above-surface. The providing can also occur in the subterranean formation.

In some embodiments, forming the sealant occurs near at least one of a casing, a casing-casing annulus, a tubing-casing annulus, or a casing-formation annulus. In some embodiments, forming the sealant occurs in a void, such as a crack, microannulus, or the like, in at least one of a cement, cement sheath, and pipe.

In some embodiments, forming the sealant prevents or retards undesired loss or flow of wellbore fluid into the formation or of formation fluids into the wellbore. In some embodiments, the sealant prevents or retards undesired loss or leak off of fluid into the formation.

Also, provided in this disclosure is a method of preventing or alleviating loss of drilling fluid or other fluid circulation in a wellbore penetrating a subterranean formation. In some embodiments, the composition including the maleic anhydride copolymer, amine crosslinker, and gelling agent is provided in a weighted or unweighted "pill" for introduction into the wellbore. Such "pills" typically comprise the composition blended with a required amount of water, base oil, water base drilling fluid, or non-aqueous base drilling fluid and in some cases a weighting agent such as barite, calcium carbonate, or a salt. The amount of the composition used in the pill depends on the size of the subterranean fracture, opening, or lost circulation zone to be treated. Multiple pills or treatments may be used if needed. In some embodiments, drilling is stopped while the pill including the composition is introduced into the wellbore. The composition can enter lost circulation zones or porous or fractured portions of the formation where it will prevent or retard the entry of drilling and other wellbore fluids. Further, pressure can be used to squeeze the pill into the lost circulation zone and de-fluidize a slurry. In some embodiments, the composition including the maleic anhydride copolymer, amine crosslinker, and gelling agent also contains loss circulation materials capable of packing inside the loss circulation zone and forming a solid bridge across the loss circulation zone while the resin sets in and around the packed block thereby enhancing the effectiveness of the loss circulation material.

Servicing a wellbore includes providing a composition including a maleic anhydride copolymer, an amine crosslinker, and a gelling agent within a portion of at least one of a wellbore and a subterranean formation. The maleic anhydride copolymer includes repeat units I and II. The maleic anhydride copolymer further includes at least one second repeat unit selected from the group consisting of second repeat units III and IV.

In some embodiments, the composition is introduced into at least one of a wellbore and a subterranean formation using a pump. The maleic anhydride copolymer, the amine crosslinker, and the gelling agent can be pumped together from at least one source or simultaneously from at least two different sources. Alternatively, the maleic anhydride copolymer can be pumped first and the amine crosslinker and gelling agent can be pumped second. Alternatively, the amine crosslinker and gelling agent can be pumped first and the maleic anhydride copolymer can be pumped second. In some cases, the gelling agent may be pumped with the maleic anhydride copolymer and the amine crosslinker pumped separately. In certain cases, the maleic anhydride copolymer, the amine crosslinker, and the gelling agent may all be pumped separately.

In some embodiments, an aqueous solution containing a gelling agent is introduced into at least one of a wellbore and a subterranean formation (a gelling agent "preflush" or "pretreatment") prior to introduction of a composition including a maleic anhydride copolymer and an amine crosslinker. The composition may be free of gelling agent. In other embodiments, an aqueous solution containing a first gelling agent is introduced into at least one of a wellbore and a subterranean formation prior to introduction of a composition including a maleic anhydride copolymer, an amine crosslinker, and a second gelling agent. The first gelling agent and the second gelling agent may be the same or different.

Other Information

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" can allow for a degree of variability in a value or range, for example, within 10%, within 5%, or within 1% of a stated value or of a stated limit of a range.

The term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" refers to an organic group as defined herein or molecule in which one or more hydrogen atoms contained therein are replaced by one or more non-hydrogen atoms. The term "functional group" or "substituent" refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups.

The term "alkyl" refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "cycloalkyl" refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-, 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "alkenyl" refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH═CH(CH$_3$), —CH═C(CH$_3$)$_2$, —C(CH$_3$)═CH$_2$, —C(CH$_3$)═CH(CH$_3$), —C(CH$_2$CH$_3$)

=CH$_2$, cyclohexenyl, cyclopentenyl, cyclohexadienyl, butadienyl, pentadienyl, and hexadienyl among others.

The term "alkynyl" refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "aralkyl" refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl) alkyl groups such as 4-ethyl-indanyl. Aralkenyl groups are alkenyl groups as defined herein in which a hydrogen or carbon bond of an alkyl group is replaced with a bond to an aryl group as defined herein.

The term "heterocyclyl" refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a C$_2$-heterocyclyl can be a 5-ring with two carbon atoms and three heteroatoms, a 6-ring with two carbon atoms and four heteroatoms and so forth. Likewise, a C$_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "heterocyclylalkyl" refers to alkyl groups as defined herein in which a hydrogen or carbon bond of an alkyl group as defined herein is replaced with a bond to a heterocyclyl group as defined herein. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

The term "heteroarylalkyl" refers to alkyl groups as defined herein in which a hydrogen or carbon bond of an alkyl group is replaced with a bond to a heteroaryl group as defined herein.

The term "alkoxy" refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "amine" refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like.

The term "amino group" refers to a substituent of the form —NH$_2$, —NHR, and —NR$_2$, wherein each R is independently selected. Accordingly, any compound substituted with an amino group can be viewed as an amine. An "amino group" within the meaning herein can be a primary, secondary, or tertiary. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" refers to a functional group or molecule that includes carbon and hydrogen atoms. The term can also refer to a functional group or molecule that normally includes both carbon and hydrogen atoms but wherein all the hydrogen atoms are substituted with other functional groups.

The term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" refers to a liquid that can dissolve a solid, another liquid, or a gas. Non-limiting examples of solvents are silicones, organic compounds, water, alcohols, ionic liquids, and supercritical fluids.

The term "number-average molecular weight" refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" refers to a temperature of about 15° C. to about 28° C.

The term "polymer" refers to a molecule having at least one repeating unit and can include copolymers.

The term "copolymer" refers to a polymer that includes at least two different repeating units. A copolymer can include any suitable number of repeating units.

The term "downhole" refers to under the surface of the earth, such as a location within or fluidly connected to a wellbore.

The term "drilling fluid" refers to fluids, slurries, or muds used in drilling operations downhole, such as during the formation of the wellbore.

The term "stimulation fluid" refers to fluids or slurries used downhole during stimulation activities of the well that can increase the production of a well, including perforation activities. In some examples, a stimulation fluid can include a fracturing fluid or an acidizing fluid.

The term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

The term "fracturing fluid" refers to fluids or slurries used downhole during fracturing operations.

The term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

The term "completion fluid" refers to fluids or slurries used downhole during the completion phase of a well, including cementing compositions.

The term "remedial treatment fluid" refers to fluids or slurries used downhole for remedial treatment of a well. Remedial treatments can include treatments designed to increase or maintain the production rate of a well, such as stimulation or clean-up treatments.

The term "abandonment fluid" refers to fluids or slurries used downhole during or preceding the abandonment phase of a well.

The term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

The term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

The term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

The term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

The term "fluid" refers to gases, liquids, gels, and critical and supercritical materials.

The term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

"Treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

A "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

EXAMPLES

Two different polymers were utilized in this study. The first, obtained from a commercial source (ISOBAM 104 from Kuraray Co., Ltd.), was a poly(maleic anhydride/isobutylene)copolymer with a monomer ratio of 1:1 and a weight-average molecular weight of $5 \times 10^4$ partially hydrolyzed with ammonium hydroxide to generate amide-ammonium type of hydrolyzed functional groups. The second was partially hydrolyzed poly(maleic anhydride/isobutylene) sodium salt formed by hydrolyzing non-water soluble poly(maleic anhydride) (ISOBAM18 from Kuraray) with a weight-average molecular weight of $3 \times 10^5$ with sodium hydroxide at room temperature to generate sufficient hydrolysis (60% in the present case) to make it completely water soluble. TEPA was used as an amine-type crosslinker to crosslink the base polymer to provide suitable gel times (crosslink times) for placement by injection. A polymer to amine weight ratio of 10:1 was used.

A general procedure included dissolving the polymer in water to prepare a 10% by weight solution of the polymer and adding 1% by weight amine liquid and the specified additive with stirring. The gel times were measured using Brookfield Viscometer (DV2+ Model) supplied by Brookfield Engineering Laboratories, Inc. (Massachusetts, USA), and viscosity was monitored as a function of time at a specific temperature using a #3 spindle. In the case of gelation in the presence of set cement, a small piece(s) of set cement was added to the resin solution placed in a test tube, and the test tube was kept in an oven set at the desired temperature. The gel time was measured by periodically examining the flowability of the resin formulation as a whole and the resin solution fluidity at the solid/liquid interface between the cement surface and the resin fluid. When the resin solution was firmly set in the bulk solution as well as the solid (cement)/liquid interphase, the formulation was considered to be suitable for use, and the additive was considered to be an effective gelling agent and is defined as yielding a "homogeneous set" in Tables 1 and 2.

The gel times are defined as the time at which the slope of the curve (viscosity versus time) increases sharply. In all cases, the gels were stiff ringing type gels. A 'stiff gel' may be defined as a gel that when taken out of its container retains its shape and does not permanently deform upon application of a small force. A 'ringing gel' is defined as a gel that when a container containing the gel is gently tapped on a hard surface, it will vibrate like a tuning fork. A 'lipping gel' or 'weaker gel' is defined as a gel that, when a container holding the gel is tilted, the gel will deform and tend to flow/extend, elastically, in the direction of the tilt.

Gel times (GT) in hours in the presence and absence of set cement are provided in Tables 1 and 2 for a control composition including 10% polymer and 1% TEPA by weight, as well as compositions including 10% polymer (ISOBAM 104) and 1% TEPA by weight, and the specified additive in the specified amount. Table 1 provides results for additives in the form of single components. Table 2 provides results for additives in the form of buffers. The stability of the crosslinked gels was monitored by aging the gels at about 180° F. and observing the gels for expulsion of free water and separation of shrunken gel. The expulsion of free water and separation of shrunken gel ("syneresis"), introduces voids through which fluid may flow, and may be indicative of incomplete sealing by the gel.

TABLE 1

Gelling of composition with additives in the form of single components

| Additive | Amount (% by weight) | GT (hrs) (absence of set cement) | GT (hrs) (presence of set cement) | Observations (in the presence cement) |
|---|---|---|---|---|
| None |  | 1.5 | Not set | Not set after 15 days |
| Acids | | | | |
| Lactic acid | 1 | 0.7 | 3 | Composition not set at the interface. Bulk gel syneresed completely in 5 days. |
| Citric acid | 0.34 |  | 16 | Composition in contact with cement was not set; composition not in contact with cement was set. |
| Oxalic acid | 1 | 0.7 | 3 | White solid deposited at the cement/composition interface - not set at interface. |
| Boric acid | 1 | 0.7 | 3 | Not set at cement/composition interface; remaining bulk gel syneresed in 11 days. |
| Amino tris(methylene-phosphonic acid, pentasodium salt | 1 | 1.1 | 3 | Homogeneous set |

TABLE 1-continued

Gelling of composition with additives in the form of single components

| Additive | Amount (% by weight) | GT (hrs) (absence of set cement) | GT (hrs) (presence of set cement) | Observations (in the presence cement) |
|---|---|---|---|---|
| Organic Bases | | | | |
| Ethanolamine | 1 | 4 | Not set | Milky, unset thin solution after 24 hrs |
| Inorganic salts | | | | |
| Sodium hexametaphosphate | 2 | 0.75 | 3 | Homogeneous set |
| Sodium tetraborate | 1 | | 4 | Homogeneous set |
| Disodium hydrogen phosphate | 1.6 | | 3 | Homogeneous set |
| Sodium tetraborate | 1.1 | 2 | 4 | Homogeneous set |
| Sodium citrate | 1 | 1 | 4 | Homogeneous set |
| Sodium carbonate | 1 | 2.1 | 5 | Homogeneous set (gas evolution during heating phase) |
| Sodium phosphate | 2 | 3 | 6 | Homogeneous set |

TABLE 2

Gelling of resin formulations with additives in the form of buffers

| Additive | Amount (wt % of composition) | GT (hrs) (absence of set cement) | GT (hrs) (presence of set cement) | Observations (in the presence of cement) |
|---|---|---|---|---|
| None | | 1.5 | Not set | Flowable turbid viscous fluid that becomes clear at room temperature. Not set after 15 days |
| Ethanolamine + boric acid (1:2.6 molar ratio) | 1.4 | | 18 | Gel broke down in 5 days |
| | 6.0 | | 18 | |
| | 14 | | Not set | Not set in 20 hours |
| Ethanolamine + citric acid (1:1 molar ratio, pH 3.9) | 1.7 | | 18 | Gel broke down in 5 days |
| Ethanolamine + citric acid (2:1 molar ratio, pH 5.0) | 1.7 | | 18 | Solution in contact with cement not set |
| Ethanolamine + citric acid (2:1 molar ratio, pH 5.0) | 2.2 | 0.75 | 18 | Homogeneous set |

As seen in Tables 1 and 2, the control compositions (no additive) did not set in the presence of set cement. It was also found that, for the compositions that gelled in the presence and in the absence of set cement, the gel times of the compositions in the presence of (in contact with) set cement were greater than the gel times of the compositions in the absence of (not in contact with) set cement. When the additive was an acid, such as lactic acid, citric acid, oxalic acid, and boric acid, the composition did not gel at the interface between the resin and the cement, but gelled in the bulk solution. The bulk gel that was formed broke down quickly. In the presence of an organic amine alone, such as ethanolamine, the composition did not gel. In the presence of a buffer including an organic amine (e.g., ethanolamine and citric acid), the gel broke down after a few days (1.7 wt %, 1:1 molar ratio, pH 3.9), did not set in contact with the cement (1.7 wt %, 2:1 molar ratio, pH 5.0), or gelled after an extended length of time (18 hours) (2.2 wt %, 2:1 molar ratio, pH 5.0). The improved gelling (as a homogeneous set in the bulk as well as in contact with set cement) as seen with higher amounts of the buffer agent (2.2 wt % vs 1.7 wt %) indicates that the buffering capacity of the gelling agent is a factor and reflects potential depletion of the acid component of the buffer composition by basic component (e.g., calcium hydroxide) of set cement. Similar observations were made for a citric acid-sodium phosphate buffer system in the presence of set cement at 100° F. A composition comprised of 82.2 wt % water, 14.5 wt % ISOBAM 104, 2.4 wt % citric acid, 0.5 wt % $Na_3PO_4$, and 0.4 wt % TEPA had a gel time of 90 min at 100° F. The pH of this composition was in a range of 5.0-5.4. Additionally, a composition comprised of 81.7 wt % water, 14.4 wt % ISOBAM 104, 2.4 wt % citric acid, 0.5 wt % $Na_3PO_4$, and 1% TEPA had a gel time of 15 hat 70° F.

Homogeneous and stable gels were obtained when the additive was a salt generated by a reaction between a weak acid and a base. The base may be strong or weak, organic or inorganic. Examples of suitable salts include sodium hexametaphosphate, sodium tetraborate (synthetic or mineral borax), disodium hydrogen phosphate, sodium carbonate, sodium phosphate, and the pentasodium salt of amino tris (methylene phosphonic acid). A gel was also obtained when the additive was a buffer solution of a weak organic acid and a weak organic base, such as ethanolamine and citric acid. In general, the resulting gels were found to be more stable in the presence of set cement when the pH of the composition was in a range of about 3 to about 10.

In some examples, cement pieces to be added to the compositions before gel formation were pretreated with a 5 wt % sodium phosphate solution. The cement pieces were soaked in the phosphate solution for 10-15 minutes, and the pretreated cement was used to place into the maleic anhydride copolymer composition. For a maleic anhydride copolymer composition comprised of 82.2 wt % water, 14.5 wt % ISOBAM 104, 2.4 wt % citric acid, 0.5 wt % $Na_3PO_4$, and 0.4 wt % TEPA, the gel time was 120 minutes at 100° F. when pretreated cement pieces were included, which exceeds the gel time of 90 minutes for the same composition when untreated cement pieces were included.

Other Embodiments

Particular implementations of the subject matter have been described. Other implementations, alterations, and permutations of the described implementations are within the scope of the following claims as will be apparent to those skilled in the art. Accordingly, the above description of example implementations does not define or constrain this disclosure. Other changes, substitutions, and alterations are also possible without departing from the spirit and scope of this disclosure.

What is claimed is:

1. A composition for treating a subterranean formation, the composition comprising:
a maleic anhydride copolymer comprising:
first repeat units I and II:

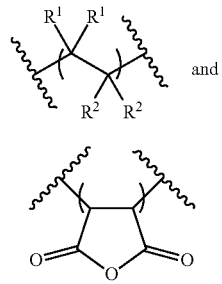

wherein each $R^1$ is independently selected from the group consisting of —H, —O($C_1$-$C_5$) alkyl, and —($C_1$-$C_5$) alkyl, and each $R^2$ is independently selected from the group consisting of —H, —O($C_1$-$C_5$) alkyl, and —($C_1$-$C_5$) alkyl; and at least one second repeat unit selected from the group consisting of repeat units III and IV:

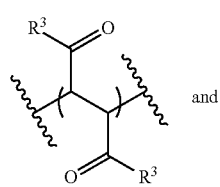

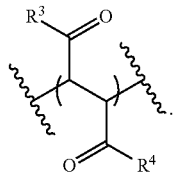

wherein each $R^3$ is independently selected from the group consisting of —OH and —O⁻$M^1$, each $M^1$ is independently selected from the group consisting of an alkali metal, an alkaline earth metal, an ammonium ion, and a quaternary ammonium ion, and each $R^4$ is independently selected from the group consisting of —$NH_2$ and —$OM^1$;

an amine crosslinker; and
a gelling agent comprising at least one of:
a salt of a weak acid and a base;
a calcium chelating agent;
a calcium precipitating agent;
a pH buffer;
an agent reactive with hydroxide; and
an acid generating agent,
wherein the gelling agent promotes formation of a gel from the maleic anhydride copolymer and the amine crosslinker in contact with set cement.

2. The composition of claim 1, wherein repeat unit III and repeat unit IV comprise repeat unit IIIA and repeat unit IVA, respectively:

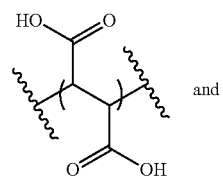

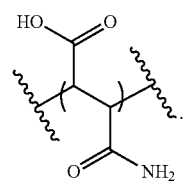

3. The composition of claim 1, wherein the base is an organic base or an inorganic base.

4. The composition of claim 1, wherein the base is a strong base or a weak base.

5. The composition of claim 1, wherein the gelling agent comprises sodium hexametaphosphate, sodium tetraborate, disodium hydrogen phosphate, sodium carbonate, or sodium phosphate.

6. The composition of claim 1, wherein the gelling agent comprises a salt of a weak acid and an organic base.

7. The composition of claim 1, wherein the gelling agent comprises the pentasodium salt of amino tris(methylene phosphonic acid).

8. The composition of claim 1, wherein the gelling agent comprises a buffer solution of a weak acid and an organic base.

9. The composition of claim 8, wherein the gelling agent comprises a buffer solution of ethanolamine and citric acid.

10. The composition of claim 1, wherein the gelling agent is about 0.5% to about 10% of the composition by weight.

11. The composition of claim 1, wherein the gelling agent is about 0.5% to about 2.5% of the composition by weight.

12. The composition of claim 1, wherein the gelling agent promotes formation of the gel comprising the maleic anhydride copolymer and the amine crosslinker in contact with set cement at a temperature in a range of about 100° F. to 180° F.

13. The composition of claim 12, wherein the gelling agent promotes formation of the gel from the maleic anhydride copolymer and the amine crosslinker in contact with set cement in about 8 hours or less.

14. The composition of claim 13, wherein the gelling agent promotes formation of the gel from the maleic anhydride copolymer and the amine crosslinker in contact with set cement in about 6 hours or less.

15. The composition of claim 14, wherein the gelling agent promotes formation of the gel comprising the maleic anhydride copolymer and the amine crosslinker in contact with set cement in about 4 hours or less.

16. The composition of claim 1, wherein the pH of the composition is in a range of about 3 to about 10.

17. A method of treating a subterranean formation, the method comprising:
   providing to the subterranean formation a composition comprising:
      a maleic anhydride copolymer comprising:
         first repeat units I and II:

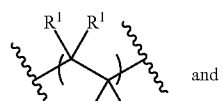
and

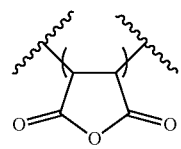

wherein each $R^1$ is independently selected from the group consisting of —H, —O($C_1$-$C_5$) alkyl, and —($C_1$-$C_5$) alkyl, and each $R^2$ is independently selected from the group consisting of —H, —O($C_1$-$C_5$) alkyl, and —($C_1$-$C_5$) alkyl; and
   and at least one second repeat unit selected from the group consisting of repeat units III and IV:

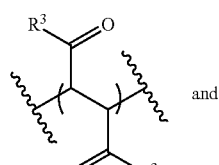
and

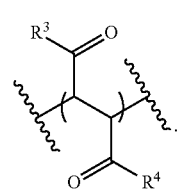

wherein each $R^3$ is independently selected from the group consisting of —OH and —O$^-$$M^1$, each $M^1$ is independently selected from the group consisting of an alkali metal, an alkaline earth metal, an ammonium ion, and a quaternary ammonium ion, and each $R^4$ is independently selected from the group consisting of —$NH_2$ and —O$M^1$;
   an amine crosslinker; and
   a gelling agent comprising at least one of:
      a calcium chelating agent;
      a calcium precipitating agent;
      a pH buffer;
      an agent reactive with hydroxide;
      an acid generating agent; and
   crosslinking the maleic anhydride copolymer of the composition with the amine crosslinker of the composition to form a sealant, wherein the gelling agent promotes formation of the sealant in contact with set cement.

18. The method of claim 17, wherein crosslinking the composition to form the sealant occurs near a casing, a casing-casing annulus, a tubing-casing annulus, or a casing-formation annulus.

19. The method of claim 17, wherein crosslinking the composition to form the sealant prevents or retards undesired loss or flow of wellbore fluid into the formation or of formation fluids into the wellbore.

20. A method of treating a subterranean formation, the method comprising:
   providing, to the subterranean formation comprising a cemented zone comprising set cement, an aqueous solution comprising a gelling agent to yield a pretreated subterranean formation, wherein gelling agent comprises at least one of:
      a calcium chelating agent;
      a calcium precipitating agent;
      a pH buffer;
      an agent reactive with hydroxide; and
      an acid generating agent;
   providing to the pretreated subterranean formation a composition comprising:
      a maleic anhydride copolymer comprising:
         first repeat units I and II:

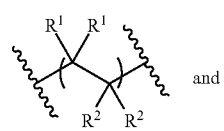
and

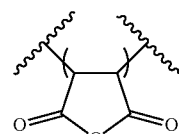

wherein each $R^1$ is independently selected from the group consisting of —H, —O($C_1$-$C_5$) alkyl, and —($C_1$-$C_5$) alkyl, and each $R^2$ is independently selected from the group consisting of —H, —O($C_1$-$C_5$) alkyl, and —($C_1$-$C_5$) alkyl; and
   at least one second repeat unit selected from the group consisting of repeat units III and IV:

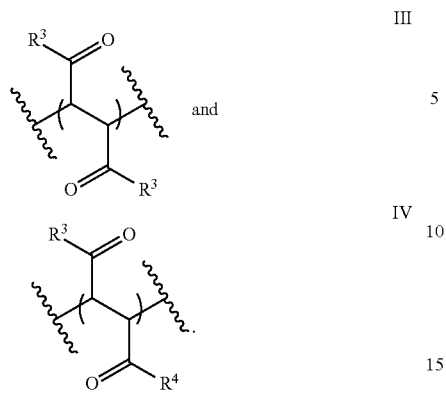

wherein each $R^3$ is independently selected from the group consisting of —OH and —O$^-$M$^1$, each M$^1$ is independently selected from the group consisting of an alkali metal, an alkaline earth metal, an ammonium ion, and a quaternary ammonium ion, and each $R^4$ is independently selected from the group consisting of —NH$_2$ and —OM$^1$; and an amine crosslinker; and crosslinking the maleic anhydride copolymer of the composition with the amine crosslinker of the composition to form a sealant, wherein the gelling agent promotes formation of the sealant in contact with set cement.

21. The method of claim 20, wherein the gelling agent is a first gelling agent, and the composition comprises a second gelling agent.

* * * * *